3 Sheets—Sheet 1.
H. STOLPE.
COMBINED PUNCHING AND SHEARING MACHINE.
No. 11,098. Reissued July 22, 1890.
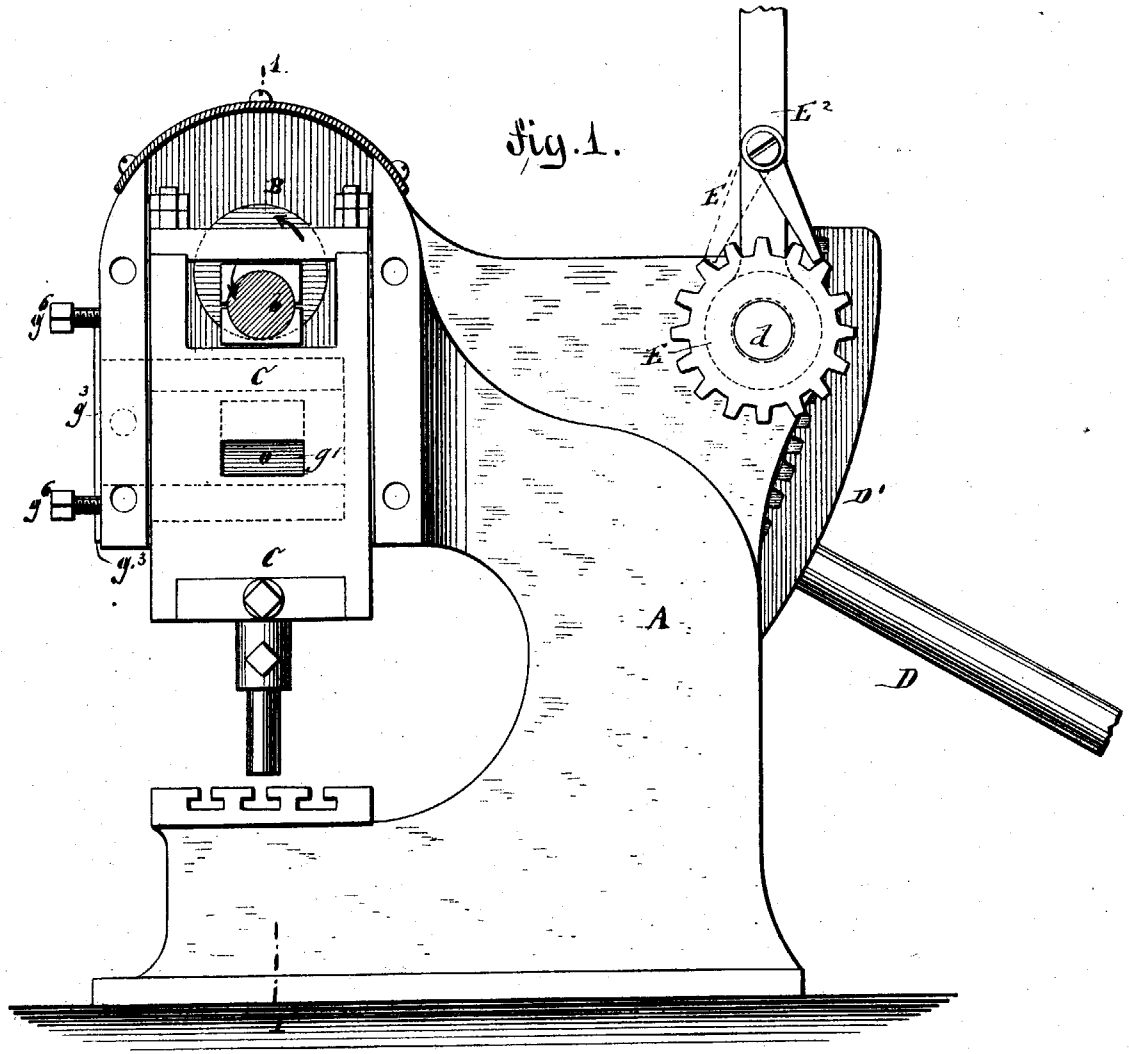
WITNESSES:
Fd. W. Rosenbaum.
M. Meinhen
INVENTOR
Hugo Stolpe
BY
Gorne & Regener
ATTORNEYS.
THE NORRIS PETERS CO., PHOTO-LITHO., WASHINGTON, D. C.

3 Sheets—Sheet 2.
H. STOLPE.
COMBINED PUNCHING AND SHEARING MACHINE.
No. 11,098. Reissued July 22, 1890.
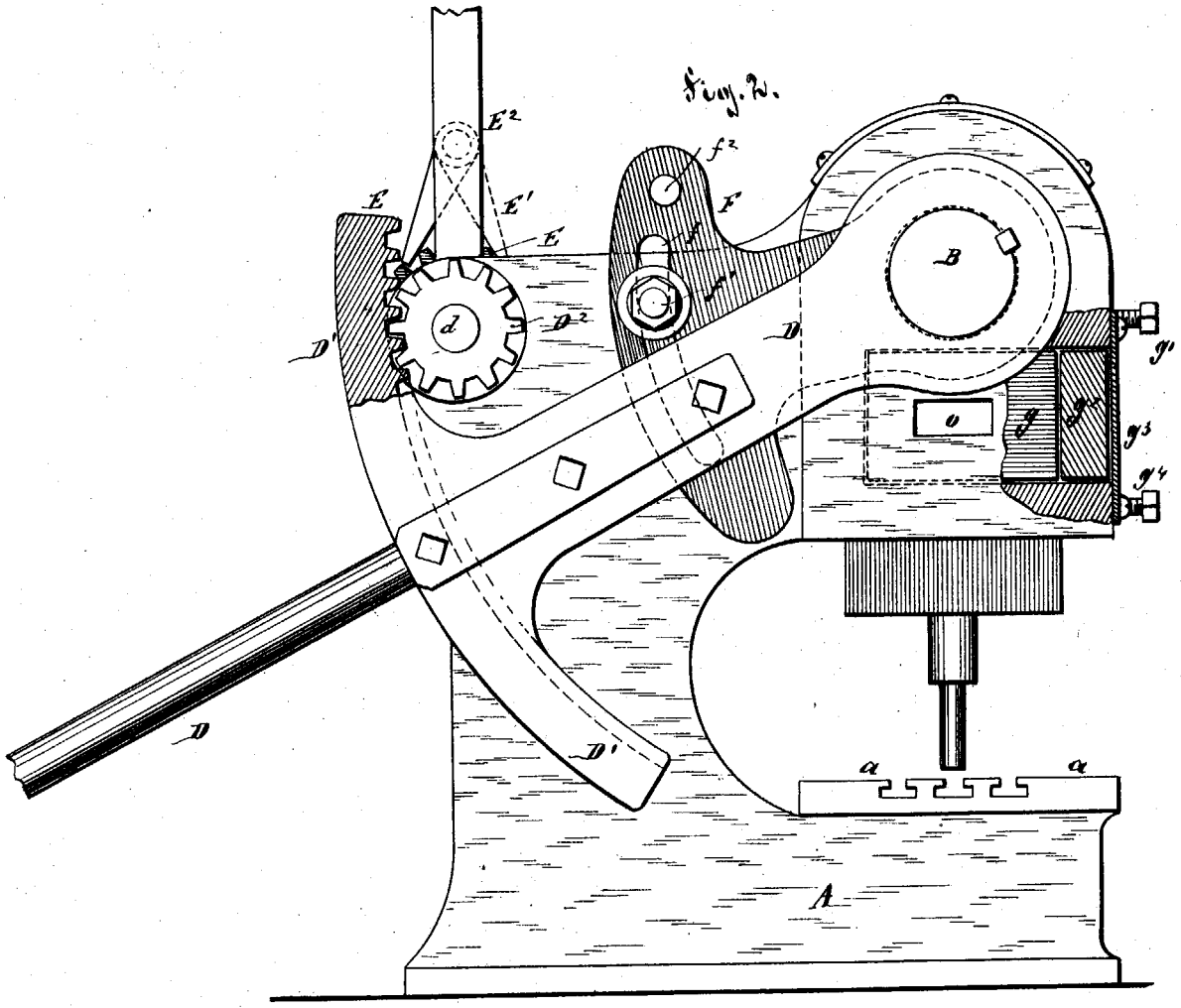
WITNESSES:
Henry Huber
M Reimherr
INVENTOR
Hugo Stolpe
BY
George Raegener
ATTORNEYS.
THE NORRIS PETERS CO., PHOTO-LITHO., WASHINGTON, D. C.

H. STOLPE.
COMBINED PUNCHING AND SHEARING MACHINE.
No. 11,098. Reissued July 22, 1890.
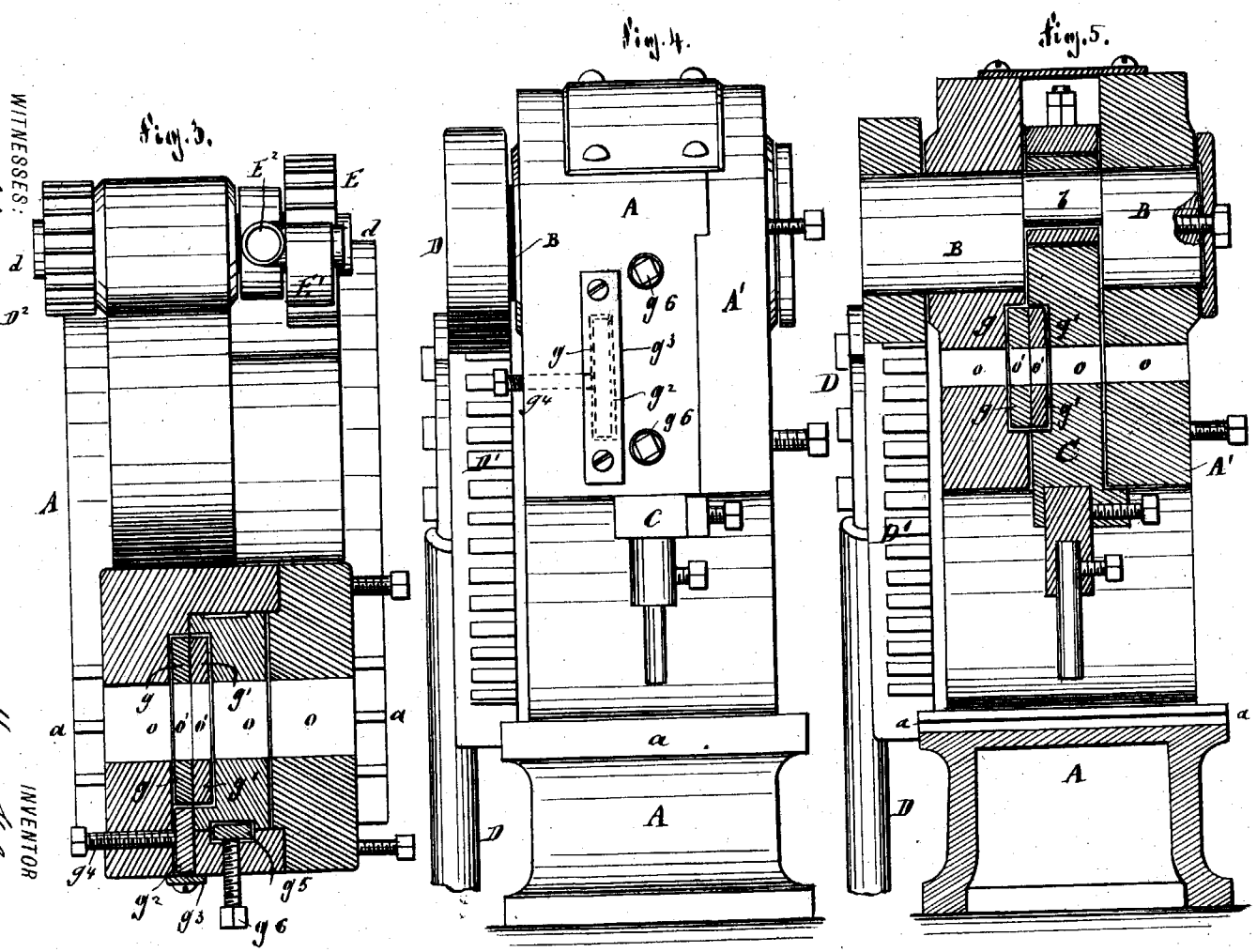
WITNESSES:
Henry Huber
W. Reinhart
INVENTOR
Hugo Stolpe
BY
Geo. H. Raegener
ATTORNEYS.
THE NORRIS PETERS CO., PHOTO-LITHO., WASHINGTON, D. C.

UNITED STATES PATENT OFFICE.

HUGO STOLPE, OF NEW YORK, N. Y.

COMBINED PUNCHING AND SHEARING MACHINE.

SPECIFICATION forming part of Reissued Letters Patent No. 11,098, dated July 22, 1890.

Original No. 426,340, dated April 22, 1890. Application for reissue filed June 27, 1890. Serial No. 357,003.

*To all whom it may concern:*

Be it known that I, HUGO STOLPE, of New York, in the county of New York and State of New York, have invented certain new and useful Improvements in Combined Punching and Shearing Machines; and I do hereby declare that the following is a full, clear, and exact description thereof.

This invention relates to an improved metal punching and shearing machine of that class in which a vertically-reciprocating ram, which is constructed to carry punches, dies, &c., operates on the metal placed on a stationary bed or die below the ram, the machine being designed to be a portable one and adapted to be operated by hand-power for facilitating the punching and shearing operations at the place where the work is to be executed.

The invention consists of a punching and shearing machine in which a vertically-reciprocating ram that carries the punching tool or die is guided in ways of a supporting-standard, said ram being suspended eccentrically from a main shaft supported in bearings of the supporting-standard and operated by a lever carrying a toothed segment, which lever serves for lifting the ram, while a pinion meshing with the segment is turned by a pawl-and-ratchet mechanism operated by a second oscillating lever, so as to produce the lowering of the ram and the simultaneous raising of the toothed segment and its lever.

The invention consists, further, in the arrangement of a stop device in connection with the ram-lifting lever, and, lastly, of a metal-shearing device formed of two shearing-cutters, which are inserted through a front opening of the standard into adjacent recesses, respectively, of the the standard and ram, the standard, ram, and cutters being provided with transverse openings for inserting the bars, rods, or other articles to be sheared off, the cutters being retained in position by suitable locking mechanism, as will be fully described hereinafter, and finally pointed out in the claims.

In the accompanying drawings, Figure 1 represents a side elevation of my improved punching and shearing machine, showing the covering-blade of the guideways removed. Fig. 2 is an elevation of the opposite side of the machine, shown with parts in section. Fig. 3 is a plan view, partly in horizontal section, through the shearing device; Fig. 4, a front elevation, and Fig. 5 a vertical transverse section, on line 1 1, Fig. 1.

Similar letters of reference indicate corresponding parts.

A in the drawings represents a strong supporting-frame, which is provided with a stationary bed or die *a* at the lower part and a curved upper part or standard that is provided with bearings for the journals of a main shaft B. The upper part of the supporting frame or standard A is recessed and provided with ways for guiding a reciprocating ram C, which is covered by a cheek-plate A′, that is rigidly bolted to the standard A when all the parts of the machine are properly assembled.

The ram C is suspended by means of suitable bearings from an eccentric portion *b* of the shaft B and reciprocated by the same vertically in the ways at the upper part of the standard A, its lower part being arranged in the usual manner to carry a punch or die for operating on the metal plates placed on the stationary bed or die *a*.

The tools or dies may be readily changed, according to the size of the holes to be punched and secured by means of set-screws, respectively, to the ram and into the tool-socket of the same. To one end of the main shaft B is keyed a lever D, which is provided with an interiorly-toothed segment D′, that meshes with a pinion $D^2$ at the upper rear part of the supporting-standard A. The shaft of the pinion $D^2$ turns in bearings of the standard A and carries at its opposite end a ratchet-wheel E, which is engaged by a gravity-pawl E′, that is pivoted to a hand-lever $E^2$, which is connected loosely to the shaft *d*, as shown clearly in Figs. 1 and 3. By lifting the lever D and segment D′ the shaft B is turned, and thereby the ram C raised, in which case the ratchet-wheel E follows the motion of the segment D′ by the action of the pinion $D^2$ without being interfered with by the pawl E′, which is swung on its pivot into the position shown in dotted lines in Fig. 1.

For lowering the ram C and its working-tool the pawl E′ is moved into the position shown in full lines in Fig. 1 and the lever $E^2$ reciprocated backward and forward, so that the pawl E′ engages the teeth of the ratchet-wheel E and causes the successive turning of the same, and by the intermeshing of the pinion $D^2$ with the segment D′ the gradual lowering of the latter with its lever D and the turning of the shaft B on its axis. The eccentric *b* is thereby moved with the ram into the lowered position and the punching or other work accomplished. By the successive action of the lever $E^2$ a step-by-step downward movement of the punching-tool is provided. The pawl E′ can be set so as to engage the ratchet-wheel E either in front of or back of the lever $E^2$, which has the advantage that in the latter position (shown in dotted lines in Fig. 1) the tool can first be raised by the lever E, so as to clear the tool from the work just punched, after which the final lifting of the ram and tool is accomplished by the lever D. On the main shaft B is arranged a stop-plate F, which is provided with an arc-shaped slot *f* and screwed to the standard A by a set-screw *f′*. A stop-pin $f^2$ at the upper part of the stop-plate F is adjusted higher or lower relatively to the lever D by means of the adjustment of the said stop-plate F, so as to control thereby the extent of motion of the lever D, as required by the punching-tool. By the adjustment of the stop-plate F the stroke of the ram can be accurately regulated.

The supporting-standard A, cheek-plate A′, and ram C are provided with openings *o o*, of oblong or other shape, through which a bar, rod, or other article of metal can be introduced for being subjected to the shearing action of the machine. The shearing action is produced by two shearing-knives *g* and *g′*, of which one is inserted into a recess of the supporting-standard A, while the other is inserted into an adjacent recess of the ram C, as shown clearly in Fig. 5. The shearing-knives *g g′* are inserted into the standard and ram, respectively, through an opening in the front part of the standard A, which opening is arranged at right angles to the transverse openings *o o*. The front opening is closed by a suitable filling-piece $g^2$, which is retained in position by a covering-plate $g^3$ and set-screw $g^4$, as shown clearly in Figs. 3 and 4. A guide-strip $g^5$, which is tightened by set-screws $g^6$, arranged at the front part of the standard A, serves for steadily guiding the ram C in the standard A, and prevents any loose motion of the same. The shearing-knives *g g′* are also provided with openings *o′* in line with the openings *o* of the standard and ram. The shearing action of the knives *g g′* is accomplished by the successive lowering of the ram by the hand-lever $E^2$ and pawl-and-ratchet mechanism E E′ in the same manner as before described for the punching action of the ram, so that a powerful and effective shearing action is exerted on the metal to be operated upon.

The machine is intended to be made portable, so as to be easily carried to the place of use, permitting the punching and shearing of large plates and bars of metal and forming a convenient and effective hand-operated tool for metal-workers of all kinds.

Having thus described my invention, I claim as new and desire to secure by Letters Patent—

1. The combination, with a supporting-standard, of a vertically-reciprocating ram guided in said standard, a main shaft journaled in said standard and provided with an eccentric portion from which the ram is suspended, a ram-lifting lever on the main shaft, a toothed segment on the lifting-lever, a pinion meshing with said segment, an oscillating lever on the shaft of the pinion, and a pawl-and-ratchet mechanism operated by the oscillating lever for gradually lowering the ram, substantially as set forth.

2. The combination, with a supporting-standard, of a vertically-reciprocating ram guided in said standard, a main shaft journaled in said standard and provided with an eccentric portion from which the ram is suspended, a ram-lifting lever keyed to the main shaft and provided with a toothed segment, a pinion meshing with said segment, an oscillating lever applied to the shaft of the pinion, a pawl-and-ratchet mechanism operated by said lever, and an adjustable stop device connected to the main shaft and standard for regulating the extent of motion of the ram and working-tools, substantially as set forth.

3. The combination, with a supporting-standard, of a reciprocating ram guided in said standard, a rock-shaft, a cam thereon, a lever on said rock-shaft and having a rack secured thereto, a shaft provided with a pinion meshing with the rack, a ratchet rotatable with said pinion-shaft, a lever loosely mounted on the pinion-shaft and having a gravity-pawl adapted to engage the ratchet, and shearing-blades secured to said ram and to the sides of the standard, substantially as set forth.

4. The combination of a supporting-standard, a ram operating in guides in said standard, said standard and ram having transverse openings, shearing-knives seated, respectively, in recesses of the standard and ram and having openings adapted to align with the openings in the standard and ram, said knives being inserted into the recesses of the standard and ram through a front opening in the standard at right angles to the transverse openings, and means for securing said knives to the standard and ram, substantially as set forth.

5. The combination of a supporting-standard, a ram operating in guides in said standard, said standard and ram having transverse openings, knives secured, respectively, to said standard and ram and having openings adapted to align with the openings in the standard and ram, a filling-piece in the opening in the standard, and a securing-plate therefor, substantially as described.

HUGO STOLPE.

Witnesses:
PAUL GOEPEL,
MARTIN PETRY.